Figure 2:
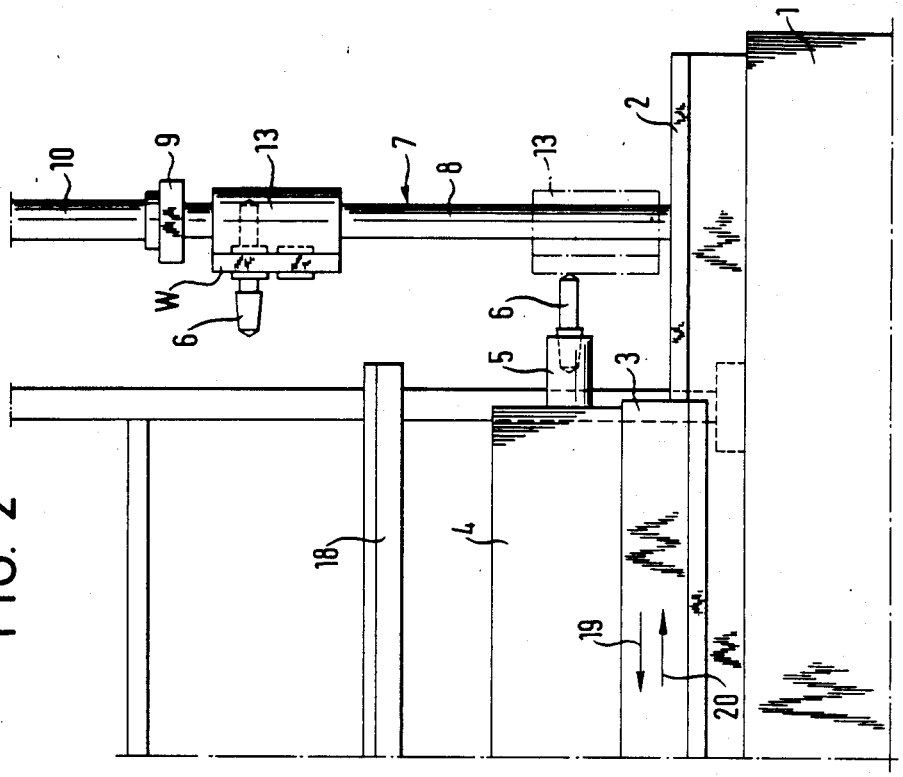

United States Patent [19]

Fischer et al.

[11] Patent Number: 4,669,174
[45] Date of Patent: * Jun. 2, 1987

[54] TOOL EXCHANGE ARRANGEMENT FOR A MULTI-SPINDLE MACHINE TOOL

[75] Inventors: Peter Fischer; Rainer Schmolz, both of Aalen; Eugen Wurstner, Ellwangen, all of Fed. Rep. of Germany

[73] Assignee: Alfing Kessler Sondermaschinen GmbH, Aalen-Wasseralfingen, Fed. Rep. of Germany

[ * ] Notice: The portion of the term of this patent subsequent to Aug. 20, 2002 has been disclaimed.

[21] Appl. No.: 666,107

[22] Filed: Oct. 29, 1984

[30] Foreign Application Priority Data

Nov. 14, 1983 [DE] Fed. Rep. of Germany ....... 3341167

[51] Int. Cl.⁴ ............................................ B23Q 3/157
[52] U.S. Cl. ..................................... 29/568; 29/26 A
[58] Field of Search ................. 29/568, 26 A; 408/31, 408/42, 43

[56] References Cited

U.S. PATENT DOCUMENTS

| 3,188,736 | 6/1965 | Brainard et al. | 29/568 |
| 3,288,032 | 11/1966 | Pankonin et al. | 29/568 |
| 3,566,516 | 3/1971 | Brainard et al. | 29/568 |
| 3,973,863 | 8/1976 | Smith | 408/31 |
| 4,000,954 | 1/1977 | Patel | 408/31 |
| 4,532,693 | 8/1985 | Gucklhorn et al. | 29/568 |
| 4,535,527 | 8/1985 | Fischer et al. | 29/568 |
| 4,571,813 | 2/1986 | Fukuoka et al. | 29/568 |

FOREIGN PATENT DOCUMENTS

| 3242439 | 5/1984 | Fed. Rep. of Germany | 29/568 |
| 7538 | 1/1984 | Japan | 29/568 |
| 2127723 | 4/1984 | United Kingdom | 29/568 |

Primary Examiner—Gil Weidenfeld
Assistant Examiner—Daniel W. Howell
Attorney, Agent, or Firm—Brooks Haidt Haffner & Delahunty

[57] ABSTRACT

In order to permit problem free removal and loading in a tool exchange arrangement for a machine tool arranged on a lateral or console unit of a transfer machine even if the lateral or console units are arranged next to one another at the smallest possible spacing according to the DIN norm, a tool carrier is movable from its loading position into the region of a service area above the machine tool or the transfer machine into the exchange position in front of the processing spindles.

17 Claims, 6 Drawing Figures

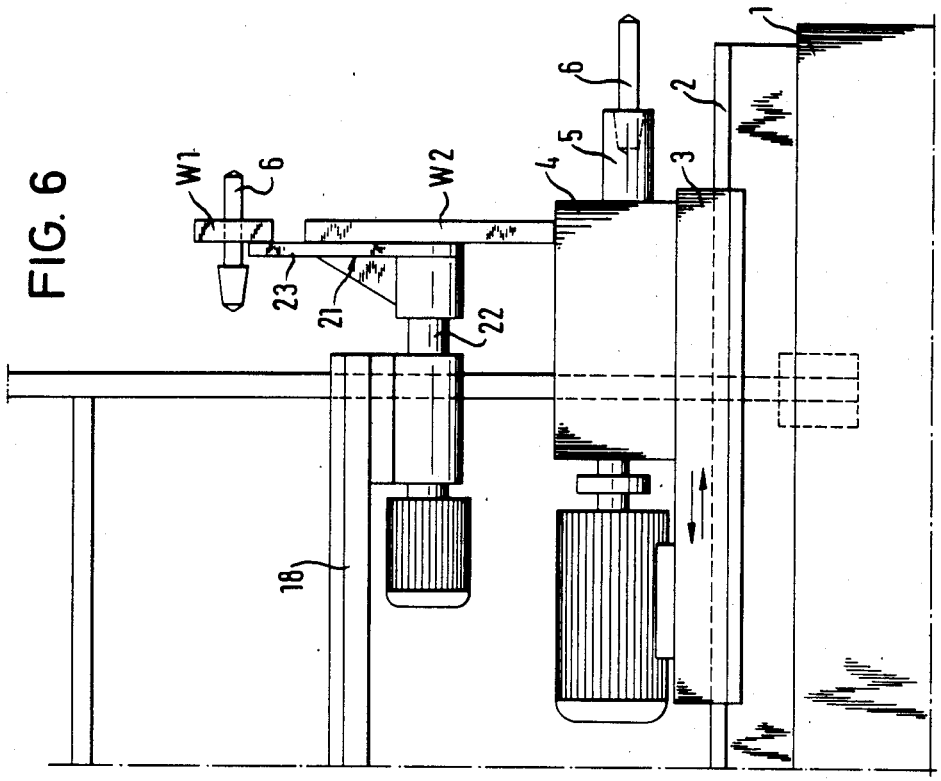
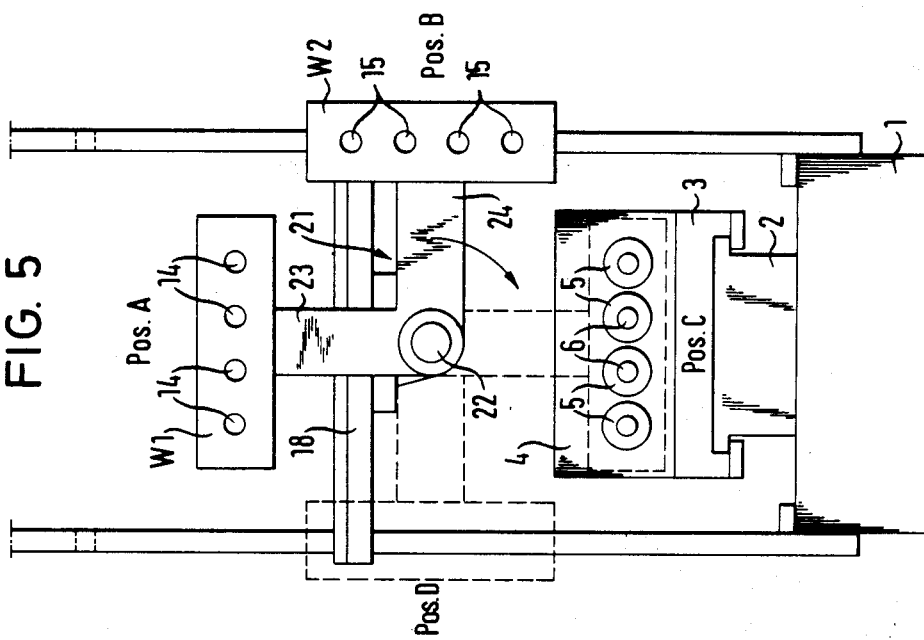

TOOL EXCHANGE ARRANGEMENT FOR A MULTI-SPINDLE MACHINE TOOL

The present invention relates to a tool exchange arrangement for a machine tool arranged on the lateral or console unit of a transfer machine comprising a spindle unit, drive elements and a plurality of processing spindles, which has a tool carrier for receiving the tools to be removed and the new tools, which tool carrier is movable from a loading position into an exchange position in front of the processing spindles.

Tool exchange arrangements for machine tools having a plurality of processing spindles, i.e. for so-called multi-spindle machine tools, are known. They have the objects of removing automatically a set of adjacently arranged tools (for example boring tools, sinking tools, thread-cutting tools, fine boring tools or similar tools) which are driven by separate spindles and replacing them by another new set.

With known tool exchange arrangements of this type (cf. DE-AS No. 19 20 275) the tool carrier is constructed as an arm rotatable about its longitudinal axis, which arm is pivotable at one end about a vertical axis lying adjacent the machine tool. The arm carries two rows of tool receivers which are mutally offset by 90° about the rotational axis and in each case are arranged for the reception of the tools to be removed (first row) and of the new tools (second row).

For movement of the arm from the exchange position in front of the processing spindles into the loading position adjacent the machine tool, the arm is pivoted by about 90° about the vertical axis lying adjacent the machine tool. Since the arm sweeps through a relatively large area during this pivoting movement, such known tool exchange arrangements require relatively large space in that region in which, as a result of the connection of the lateral or console unit to the central unit of the transfer machine, little space is available. Therefore the arm is located with the tool receivers in the loading position adjacent the lateral or control unit relatively close to the central unit so that the removal of the tools to be exchanged and the loading with new tools must be carried out in the space between two lateral of console units, whereby owing to the narrow space for the arrangement of the neighboring lateral or console unit the smallest possible distance, according to the DIN norm, between the neighboring lateral or console unit cannot be employed. The necessity of providing in each case a large distance between the lateral or console units with such machine tools provided with tool exchange arrangements leads to relatively long transfer machines and therewith to increased expense of the production line and increase of the space requirements.

An object of the present invention is to provide a completely new type of tool exchange arrangement for a machine tool arranged on a lateral or console unit of a transfer machine, which exchange arrangement allows problem-free removal and loading even if the lateral or console units are arranged next to one another at a spacing according to the DIN norm.

This object is achieved according to the invention in that the tool carrier is movable from the loading position in the region of a service area above the machine tool or transfer machine into the exchange position in front of the processing spindles.

By the features according to the invention a tool exchange arrangement is provided for the first time in which the tool carrier is pivoted from its exchange position in front of the processing spindles not as previously laterally next to the machine tool but in a loading position which is arranged above the machine tool and is accessible from a service area also above the machine tool or the transfer machine.

This mode of operation has the advantage that the removal of the tools to be exchanged and the loading with new tools need not be carried out, as previously, in the narrow passage between two lateral or console units, but can take place from the service area arranged above the machine tool in which there is always sufficient space available. In the service area, the tools can be supplied in the usual manner by means of tool trolleys or automatic transport systems and can be positioned from there manually or automatically into the tool carrier or removed from this. In the case of manual loading, it is not necessary that the service person negotiates the narrow space between the lateral and console units of two neighboring machine tools and thereby is exposed to danger from the tools and tool spindles. The service person can therefore undertake the removal of the tools to be exchanged and loading with new tools in a region which is distant from rotating parts and tools and therefore is completely safe.

The arrangement according to the invention enables furthermore a construction in which, in contrast to known constructions, no parts or aggregates of the tool exchange arrangement lie in the region in front of and next to the tools and the processing spindles in the processing phase of the machine tool. This means that the critical and narrow space in the adjoining region of the lateral or console units against the central unit remains free from any device parts so that the freedom of maneuver for the constructor of machine tools for transfer machines is not limited as compared with usual solutions. Fundamentally the tool carrier can be moved from its loading position in the region of the service area above the machine tool in any desired movement path into the exchange position in front of the processing spindles. A construction which is particularly advantageous as regards the technical expenditure and the route necessary for the movement results however if the movement path of the tool carrier from the loading position in the service area to the exchange position in front of the processing spindles lies in a plane passing essentially vertically and at right angles to the axes of the processing spindles.

Guidance of the tool carrier along the movement path can be achieved basically in any desired manner. A particularly advantageous arrangement results however if a linear guide is provided, preferably in the form of a column guide or a cam guide. Such a straight line or curved guide has many advantages and enables a technically simple and compact arrangement.

A guide which is advantageous from a technical viewpoint is also achieved by an arrangement in which the tool carrier is movable by means of at least one pivotable arm from its loading position into the exchange position. Such pivotable arm guides are very simple in construction and enable moreover a precise positioning in the exchange or loading position.

A particularly advantageous pivotable arm construction results if this is pivotable about a horizontal axis which is parallel to the axes of the processing spindles and arranged above these.

It is however also possible to mount the pivot arm pivotably about an axis arranged predominantly horizontally and at right angles to the axes of the processing spindles. In such a case however the pivot arm must be relatively long and be arranged on the side of the machine tool.

The tool carrier can be constructed in known manner as a plate, frame or the like and be provided with openings for the new tools and those to be exchanged. The arrangement of holes in the tool carrier is in accordance with the arrangement of spindles of the machine tool, two rows being provided in each case for the tools in known manner there being one row for the new tools and the other row for the tools to be exchanged.

According to an advantageous development of the invention, the tool carrier can however deviate from this know form and include according to the invention two separate units of which the one is adapted to receive the tools to be exchanged and the other for reception of the new tools. These units can likewise in each case be constructed as plates, frames and the like and carry the tools in the usual reception openings. The construction in the form of separate units enables however completely new possibilities from a technical viewpoint. Thus, the tool carrier units can be moved according to a further advantageous construction completely independently of one another. This completely independent movement possiblity can furthermore be utilized in that the tool carrier units are guided separately from one another in such manner that they lie next to one another in the loading position. Such an arrangement produces completely new possibilities for the loading with new tools or for the removal of the tools to be exchanged and thereby enables a rational mode of operation during tool exchange which in known manner cannot only exchange sharp tools for dull tools but also can contain tools of a processing sequence.

In order to achieve that the tool carrier units lie adjacent to one another in the loading position, it is advantageous to arrange the movement paths to diverge in the direction of the loading position. Where a column guide is used as a straight line guide, it is expedient to arrange the column guide for the one tool carrier unit on the one side and the column guide for the other tool carrier unit on the other side of the machine tool.

A particularly stable and precise guidance with technically simple construction is achieved if each column guide has two adjacently arranged columns which carry a sliding head on which the respective tool carrier unit is secured cantilevered towards one side.

In a preferred exemplary embodiment of pivot arm guide, the pivot arm is constructed as an angled arm with two arms positioned at 90° to one another on whose free ends respective tool carrier units are arranged. In such a construction, a very favorable geometry of the arrangement is achieved with small space requirements. Advantageously in such a case a mode of operation is achieved in which the angled arm is pivotable into four switching positions mutually offset by 90°.

Figure 1:
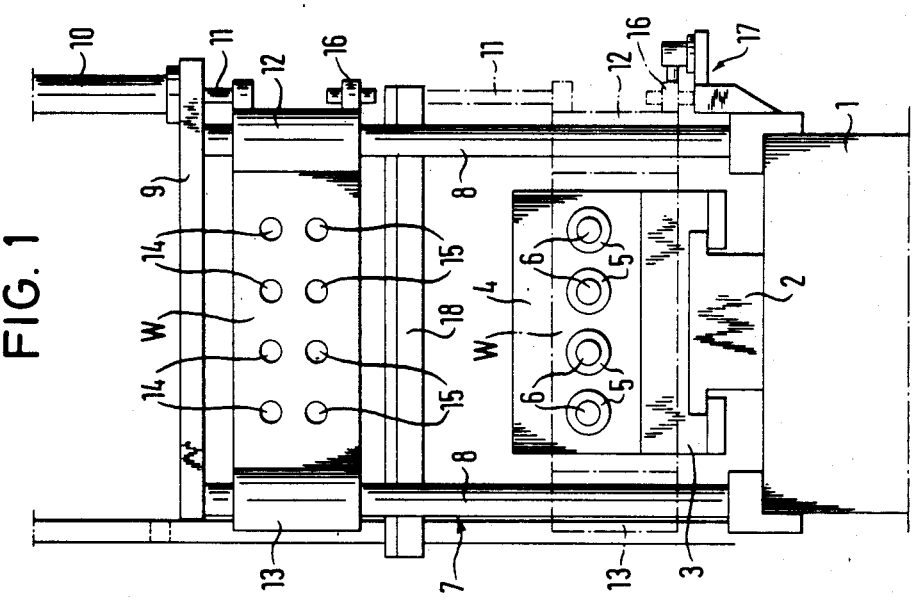
Figure 4:
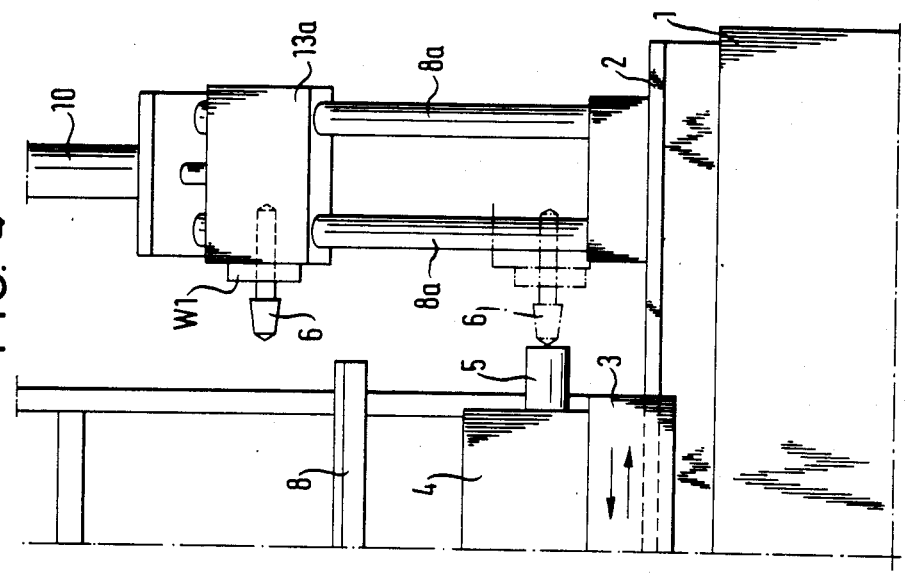
Figure 3:
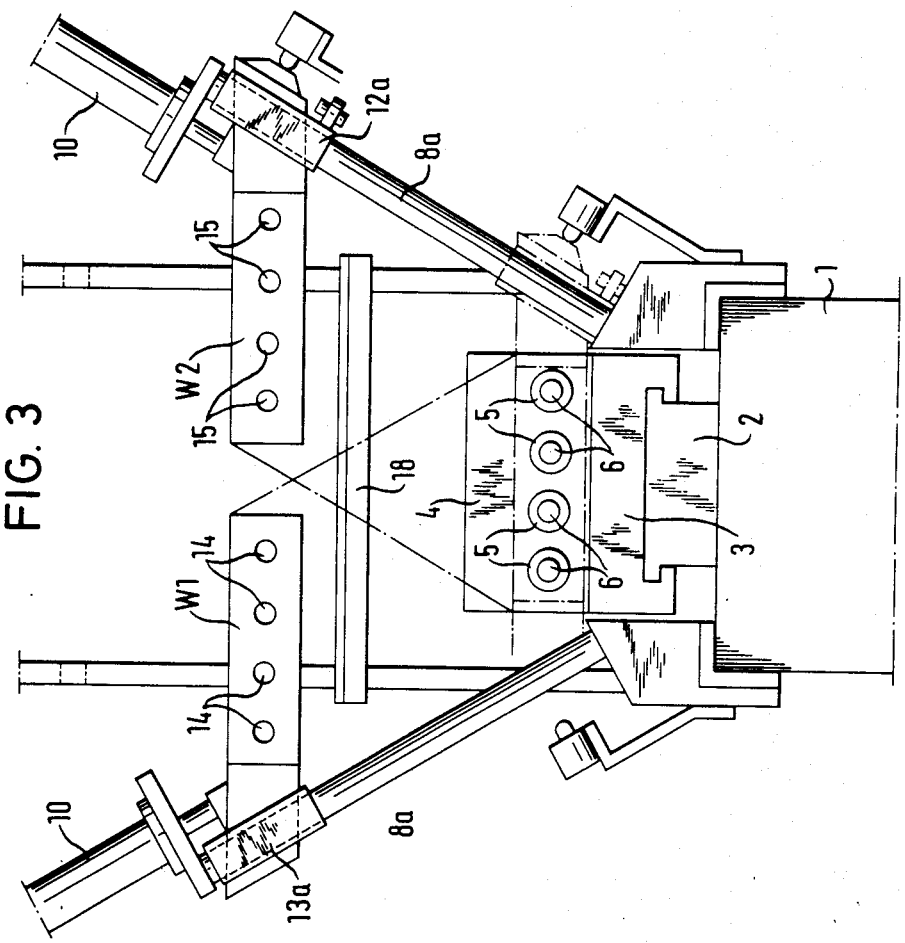

In the following, for further explanation and better understanding, three exemplary embodiments of tool exchange device according to the invention for a machine tool arranged on a lateral or console unit of a transfer machine are described in more detail with reference to the attached drawings, in which:

FIGS. 1 and 2 show schematically a front view and a side view a first exemplary embodiment of a tool exchange device according to the invention, FIGS. 3 and 4 show schematically in front view and side view a second exemplary embodiment of a tool exchange device according to the invention, and FIGS. 5 and 6 show schematically in front view and side view a third exemplary embodiment of a tool exchange arrangement according to the invention.

As appears from all figures, on the upper side of a lateral or console unit 1 of a transfer machine, a support unit 2 is arranged on whose supports 3 a spindle unit 4 is secured with its drive elements (not illustrated).

The spindle unit 4 is provided in the illustrated exemplary embodiment in each case with four processing spindles 5 which are loaded with tools 6 by means of the tool exchange arrangement according to the invention.

In the exemplary embodiment illustrated in FIGS. 1 and 2, a tool exchange arrangement comprises a straight line guide which is constructed as a column guide 7 and has two columns 8. These columns 8 extend in the vertical direction and are arranged in each case laterally of the spindle unit 4 on the lateral unit 1 in the region of its end adjoining the middle unit of the transfer machine. The columns 8 are connected in the region of their upper end with a traverse 9 which carries a working cylinder 10 whose piston rod 11 is connected to a sliding head 12 which is slidably mounted on one of the columns 8. The opposite column is likewise provided with a sliding head 13 which substantially corresponds to the sliding head 12. Between the sliding heads 12 and 13 is adjustably and exchangeably arranged a tool carrier W which in the present exemplary embodiment is in the form of a plate and has reception openings 14 and 15 for the tools.

On the sliding head 12 is furthermore arranged an adjustable stop 16 which cooperates with an exchange stop 17 which is arranged adjacent the column 8 on the upper side of the lateral or console unit 1.

The columns 8 are so dimensioned that the tool carrier W comes to lie in its raised position in the region of a service area 18 which is arranged above the spindle unit 4 of the machine tool. From this service area 18 in a convenient manner not only can new tools be inserted in the tool carrier W but also the tools to be exchanged can be removed from the tool carrier.

If now a tool exchange is to be carried out, the tool carrier W is moved by means of the working cylinder 10 from its loading position in the region of the service area 18 downardly in front of the spindle unit 4. Before this working step, the receiving openings 14 have already been loaded with new tools from the service area 18. Furthermore, before lowering of the tool carriage W, the spindle unit 4 is withdrawn in the direction of the arrow 19 (FIG. 2) in such manner that the tools 6 to be exchanged and located in the processing spindles 5 come to lie behind the tool carrier W.

As a result of the exchange stop 17, the tool carrier W is lowered by the working cylinder 10 only to the extent that the axes of the receiving openings 15 are aligned with the axes of the processing spindles 5 of the spindle unit 4. Then this is achieved, the spindle unit 4 is displaced in the direction of the arrow 20 to an extent that the tools 6 to be exchanged extend into the receiving openings 15 of the tool carrier W and are removed from this in the usual manner after release from the spindles. Following this, the spindle unit 4 is withdrawn again in the direction of the arrow 19 (FIG. 2) and the exchange stop 17 activated so that the tool carrier 13 can be lowered by means of the working cylinder 10 to the extent that the new tools 6 in the receiving openings 14 of the tool carrier come to lie in front of the processing spindles 5 of the spindle unit 4. The spindle unit is then displaced in the direction of the arrow 20 for reception of the new tools and after their reception is withdrawn again in the direction of the arrow 19. Upon this withdrawal motion, the new tools are withdrawn by means of the processing spindles from the tool carrier W so that this can be raised with the tools to be exchanged from the exchange position again into its loading position in the region of the service area 18.

In the exemplary embodiment represented in FIGS. 3 and 4, the tool carrier W consists of two mutually separated units W1 and W2, of which the tool carrier unit W1 has the reception openings 14 for the new tools and the tool carrier unit W2 has the reception openings 15 for the tools to be exchanged.

The tool exchange units W1 and W2 are in each case secured adjustably and exchangeably with their one side on sliding heads 12a and 13a. The sliding heads 12a and 13a are in each case mounted on column pairs 8a to be movable to and fro which column pairs are not arranged to be parallel, contrary to the exemplary embodiment illustrated in FIGS. 1 and 2, but are arranged at an angle to one another. The angle of the column pair 8a is so selected that the tool carrier units W1 and W2 lie in the exchange position precisely in front of the processing spindles 5 but in the loading position—as shown in FIG. 3—come to lie adjacent one another.

As appears from FIG. 3, each of the tool carrier units W1 and W2 is displaceable by means of its own working cylinder 10 on the respective column pair 8a. In this manner, the tool carrier units W1 and W2 can be moved completely independently of one another between their exchange position and their loading position.

Now if after the end of their service or edge life the tools located in the processing spindles 5 are to be exchanged, after withdrawal of the slide unit 4 the tool carrier unit W2 is displaced by means of the working cylinder 10 into its exchange position in front of the processing spindles 5. Following this—as described above—the tools to be exchanged are transferred to the tool carrier unit W2 which then is raised into its loading position in the region of the service area 18. When this has been completed, the tool carrier unit W1, which was already previously loaded with new tools, is lowered from its loading position illustrated in FIG. 3 into its exchange position in front of the processing spindles 5. Following this, again as described above, the transfer takes place of the new tools onto the processing spindles 5 of the tool unit 4.

As soon as this transfer has taken place, the tool carrier unit W1 can be raised by means of the relevant operating cylinder 10 again from its exchange position into the loading position illustrated in FIG. 3 into the region of the service area 18.

Also in this exemplary embodiment, the position of the tool carrier units W1 and W2 is established by means of adjustable stops and counterstops which however are of known construction and for this reason are not described in detail.

In the exemplary embodiment illustrated in FIGS. 5 and 6, the tool carrier likewise consists of two mutually separated units W1 and W2, the tool carrier unit W1 carrying the reception openings 14 for the new tools and the tool carrier unit W2 carrying the receiving openings 15 for the tools to be exchanged.

In contrast to the above-described exemplary embodiment however, guidance of the mutually separated tool carrier units is achieved by means of a pivot arm 21 which is pivotable about a horizontal axis 22 which extends parallel to the axes of the processing spindles 5 and above these.

The pivot arm 21 is constructed in the present exemplary embodiment as an angled arm having two arms 23 and 24 mutually offset by 90°, on whose free ends the tool carrier units W1 and W2 respectively are secured.

During the processing, the pivot arm 21 with the tool carrier units W1 and W2 is located in the position illustrated in FIG. 5. During this time, the tool carrier unit W1 is loaded in the usual manner with new tools whilst the reception openings 15 of the tool carrier unit W2 are empty.

If now a tool exchange is to be carried out, the spindle unit 4 is withdrawn in the above-described manner and the pivot arm 21 is pivoted by 90° in the clockwise sense. With this pivoting motion, the tool carrier unit W2 with the empty reception openings 15 arrives in front of the processing spindles 5 so that these can surrender to the tool carrier unit W2 the tools to be exchanged in the above described manner.

When this transfer process is completed, the spindle unit is again withdrawn and the pivot arm 21 pivoted by a further 90° in the clockwise sense. As a result, the tool carrier unit W1 loaded with new tools arrives in front of the now empty processing spindles, so that the transfer process of the new tools to the processing spindles can take place in the above described manner by renewed displacement and withdrawal of the spindle unit 4. When also this transfer process is completed, the pivot arm 21 is pivoted again by 90° in the clockwise sense, whereby the tool carrier unit W1 lying in front of the processing spindles is pivoted into the switching position illustrated as position D in FIG. 5. In this switching position, the tool carrier unit W2 loaded with the tools to be exchanged lies in the switching position illustrated by position A in FIG. 5 in which the tools to be exchanged can be conveniently removed from the service area 18. In this phrase, the spindle unit 4 can already execute a new working process.

If the tools to be exchanged are removed from the tool carrier unit W2 in the switching position according to position A, the pivot arm 21 is pivoted once more by 90° in the clockwise sense. As a result, the now empty tool carrier unit W2 reaches the switching position indicated as position B in FIG. 5 and is ready for the next removal process. The empty tool carrier unit W1 is again located in the switching position in position A in which it can be loaded with new tools from the service area 18.

The drive of the pivot arm 21 can be achieved with usual means both in an electrical and in a hydraulic manner so that an exact description of the necessary drive parts and positioning arrangements is superfluous.

I claim:

1. A tool exchange arrangement for concurrently exchanging a plurality of new machine tools for an equal plurality of used machine tools releasably mounted in the respective work processing spindles of a spindle unit which is mounted for reciprocal movement on a machine console respectively to and between a position wherein said tools in its said work processing spindles engage a workpiece and a retracted position, said plurality of processing spindles being arranged in a pattern on said spindle unit, said tool exchange arrangement comprising a tool service area spaced above said spindle unit, tool carrier means having first and second spaced apart pluralities of tool receiving openings each equal in number and arranged in said pattern of said plurality of work processing spindles, each of said tool receiving openings having means for grasping and releasing one of said tools therein, and means mounting said tool carrier means for sequential movement to and between a first position wherein its said first and second pluralities of tool receiving openings are within said tool service area for loading said new tools in said second plurality of tool receiving openings; thence to a second position wherein its said first plurality of tool receiving openings are respectively aligned with, for receiving said used tools from said work processing spindles on said spindle unit when the latter is in its said retracted position; thence to a third position wherein its said second plurality of tool receiving openings are respectively aligned with said work processing spindles on said spindle unit for transferring said new tools thereto; and thence to said first position thereof, said tool carrier mounting means including means for stopping said movement of said tool carrier means at each of said positions thereof.

2. Tool exchange arrangement according to claim 1 wherein the movement path of the tool carrier from the loading position at the service area to the exchange position in front of the processing spindles lies in a plane extending substantially vertically and at right angles to the axes of the processing spindles.

3. Tool exchange arrangement according to claim 1 wherein the tool carrier is movable on a linear guide from its loading position into its exchange position.

4. Tool exchange arrangement according to claim 3 wherein the linear guide is constructed as a column guide.

5. Tool exchange arrangement according to claim 1 wherein the tool carrier is movable by means of at least one pivot arm from its loading position into its exchange position.

6. Tool exchange arrangement according to claim 5 wherein the pivot arm is pivotable about a horizontal axis arranged parallel to the axes of the processing spindles and above these.

7. Tool exchange arrangement according to claim 1 wherein the tool carrier comprises first and second mutually separated units, said first unit being adapted for receiving the tools to be exchanged and said second unit being adapted for reception of new tools.

8. Tool exchange arrangement according to claim 7 wherein tool carrier units are in each case in the form of a plate or a frame and are provided with receiving openings for the tools.

9. Tool exchange arrangement according to claim 7 wherein tool carrier units are movable together in common.

10. Tool exchange arrangement according to claim 7 wherein tool carrier units are separately movable.

11. Tool exchange arrangement according to claim 7 wherein tool carrier units are so guided that they lie adjacent one another in the loading position.

12. Tool exchange arrangement according to claim 11 having a linear guide wherein the movement paths of said first and second tool carrier units diverge from the exchange position to the loading position.

13. Tool exchange arrangement according to claim 12 having linear guide means constructed as respective column guides for each tool carrier unit, and wherein the column guide of said first tool carrier unit is arranged on one side and the column guide of said second tool carrier unit is arranged on the other side of the machine tool.

14. Tool exchange arrangement according to claim 13 wherein each column guide has two adjacent columns which carry a sliding head on which the tool carrier unit is secured in a cantilevered manner on one side.

15. Tool exchange arrangement according to claim 5 wherein the pivot arm is in the form of an angled arm having two arms offset by 90° on whose free ends respective tool carrier units are arranged.

16. Tool exchange arrangement according to claim 15 wherein the angle arm is pivotable into four switching positions mutually offset by 90°.

17. The method of concurrently exchanging a plurality of new tools and used tools in the respective of a corresponding plurality of work processing spindles on a spindle unit of a machine on which the spindle unit is mounted for horizontal reciprocal movement between an extended position of the spindle unit in which said tools engage a workpice for performing a machining operation thereon and a retracted position of said spindle unit, said method comprising the steps of providing tool carrier means having spaced apart respective first and second pluralities of tool receiving openings, each said plurality corresponding in number and arrangement to said plurality of tools on said spindle unit, loading said first plurality of tool receiving openings with said plurality of new tools while leaving said second plurality of tool receiving openings empty, said loading step being performed at a tool service area spaced above said spindle unit, retracting said spindle unit to its said retracted position, then moving said tool carrier means downwardly and stopping the same in a position wherein said empty second plurality of tool receiving openings are in alignment with said plurality of used tools on said spindle unit, then moving said spindle unit towards its said extended position whereby said plurality of used tools engage the respective of said second plurality of tool receiving openings, grasping said used tools within said second plurality of tool receiving openings and releasing said used tools from said work processing spindles, and moving said spindle unit to its said retracted position, then moving said tool carrier means and stopping the same in a position wherein said first plurality of tool receiving openings are in alignment with said plurality of work processing spindles, then moving said spindle unit towards its said extended position whereby said plurality of work processing spindles engage the respective of said new tools within said first plurality of tool receiving openings on said tool carrier means, grasping said new tools within said work processing spindles and releasing said new tools from said first plurality of tool receiving openings, and moving said spindle unit to its said retracted position, and then moving said tool carrier means upwardly to said tool service area.

* * * * *